2,830,929

METHOD OF AEROSOL DISINFECTION WITH HYDROXY ALKYL SUBSTITUTED CYCLOHEXANOLS

Friedrich August Fries and Erich Berger, Marl, Germany, assignors to Chemische Werke Huls Aktiengesellschaft, Marl, Kreis Recklinghausen, Germany, a corporation of Germany No Drawing. Application June 13, 1955
Serial No. 515,236

Claims priority, application Germany June 24, 1954

1 Claim. (Cl. 167—39)

It is known that chemical compounds which contain oxygen in carbonyl groups as in aldehydes e. g. formaldehyde and in hydroxyl groups as in phenols and in hydrogen peroxide are suitable for the disinfection of rooms.

The practical employment of these disinfectants in human and animal hygiene, for example, in the disinfection of hotel and residence rooms involves difficulties which are inherent in the characteristics of the mentioned compounds. Thus these compounds may exhibit irritating action on the skin and on the organs of smell, sight and respiration, etc., as well as harmful action on metal surfaces, textile coverings, varnish coatings etc. These disadvantages are the more intense the more concentrated the compounds have to be applied for complete disinfection. Moreover, these compounds are readily altered, for example on lime-containing wall-surfaces, so that their effectiveness is reduced or destroyed. For these reasons effective and durable room disinfections, for example, in barns, has been difficult and expensive.

It has been proposed to use glycols, such as 1,3-butylene-glycol, polyglycols, such as triglycol, and ether-alcohols of glycols, such as the monoalkylethers of ethylene-glycol and of diglycols, as disinfectants. These compounds are substantially odorless and are good disinfectants particularly when they are applied even in low concentrations in the form of a fine mist such as is obtained by spraying or atomizing or in vaporized form.

The glycols, polyglycols and ether-alcohols of glycols and polyglycols which are clearly superior to the first-mentioned oxygen containing compounds with respect to harmful side effects, however, possess other disadvantages. For instance, when employed in diluted or mist form they are unable to destroy certain kinds of disease germs which have a fairly high resistance, as, for example, tubercle bacteria, coli bacteria, etc.

It has now been found that the above-mentioned disadvantages and difficulties can be avoided by employing in the form of an aerosol 1-(2' hydroxycyclohexyl)-1-alkanol of the general formula

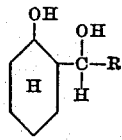

in which R is a lower alkyl group containing from 1 to 4 carbon atoms.

Specific examples are 1-(2'-hydroxy-cyclohexyl)-1-ethanol, 1 - (2'-hydroxy-cyclohexyl) - 1 - propanol, 1-(2'-hydroxy-cyclohexyl)-1-n-butonol and 1-(2'-hydroxy-cyclohexyl)-1-iso-butanol.

The compounds have been found to be effective disinfectants for germ-containing air-spaces when used in vapor form even in very low concentrations. They are highly effective also when they are sprayed in dilute or dissolved form or in the form of mists or aerosols. Water is particularly suitable as the diluent or solvent. Since, however, the mentioned dihydroxy alcohols are only sparingly soluble in water they generally must be employed in the form of emulsions which can be prepared by the addition of suitable and known emulsifiers, or else aqueous solutions must be prepared with the use of solution aids. As solution aids one may use glycols and polyglycols as well as ether-alcohols of glycols and polyglycols, which as noted above possess a weak germicidal effect.

Also a mixture of the dihydroxy alcohols of the above formula with each other or with other dihydroxy alcohols, particularly those which have at least one primary hydroxyl group which is not adjacent to another hydroxy group, can be advantageously employed. The effectiveness of such mixtures is often greater than that corresponding to the sum of the individual effects. Examples of the last-mentioned dihydroxy alcohols are 1,3-butane-diol, 1,3-pentane-diol, 2-methyl-pentane-diol, 2-ethyl-pentane-diol, 2,2 - dimethyl-pentane-diol, 2 - methyl-hexane-diol, 2-ethyl-hexane-diol, 2,2-dimethyl-hexane-diol, 2,2,4-trimethyl-pentane-diol, 2,2 - diethyl-pentane-diol, 2,2 - diethyl-hexane-diol, 2,2 - diethyl - 4 - methyl-pentane-diol, 2 - methyl - 2 - propyl - pentane - diol, 2 - methyl - 2-propyl - hexane-diol, 2,4 - dimethyl - 2 - propyl - pentane-diol, etc.

The employment of the room disinfectant is advantageously carried out in the usual manner by applying the disinfectant in the vaporized or sprayed or the mist form. The dihydroxy alcohol in vapor form acts particularly on disease germs present in the room air, while spraying of the alcohol is employed particularly when surfaces, as, for example, walls, ceilings, floors, etc. are to be disinfected. The alcohols can easily be vaporized onto surfaces which are swept with hot air. They give by atomization, particularly of their solutions, durable aerosols. By spraying they wet the surfaces to be disinfected excellently, and remain effective for a long time, since they do not react with the wall material, for example, lime.

The specified alcohols even in very low concentrations are quickly effective against the disease germs present in rooms and particularly the chemically resistant disease germs. Their use is safe, so that they can be employed without preliminary protective or safety measures.

*Example 1*

When a freshly-prepared, sterilely-elutriated suspension of tubercle bacteria is exposed to the action of a solution of a mixture of 3 parts by weight of ethylene-glycol and 1 part by weight of 1-(2'-hydroxy-cyclohexyl)-1-n-butanol in 20 parts by weight of water by adding 5 drops of the suspension of tubercle bacteria to 5 cc. of the alcohol solution, all of the germs are destroyed in 15 minutes—as can be demonstrated by 24 hours of incubation at 37° C. on suitable nutrient media.

*Example 2*

When an emulsion of 5 parts by weight of 1-(2'-hydroxy-cyclohexyl)-1-propanol in 100 parts by weight of water, which has been prepared with the help of 1.4 parts of emulsifier, is caused to act on a coli-bacteria suspension, 40 minutes is required to destroy all of the germs or render them incapable of growth. When the concentration of the emulsion is increased to 15% of the dihydroxy alcohol, all of the germs are destroyed in less than 25 minutes.

*Example 3*

When 1 cc. of 1-(2'-hydroxy-cyclohexyl)-1-propanol is vaporized in an air space of 75 cubic meters at a temperature of 23° C. and a relative humidity of 60%, sprayed-in coli-bacteria are destroyed up to 97% in 10 minutes. When, under otherwise the same conditions 2 cc. of the dihydroxy alcohol are used, 100% of the coli bacteria are destroyed in the same period of time.

We claim:

Method in disinfecting rooms which comprises applying thereto in the form of an aerosol a 1-(2'-hydroxy-cyclohexyl)-1-alkanol of the general formula

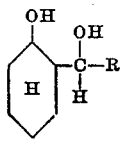

in which R is a lower alkyl group containing from 1 to 4 carbon atoms.

References Cited in the file of this patent

UNITED STATES PATENTS 2,564,665     Bartlett et al. _____ Aug. 21, 1951

OTHER REFERENCES

Schaeffer et al.: Chemical Abstracts, vol. 22, 1928, p. 1400[7].

Twort et al.: Journal Hygiene, vol. 40, 1940, pp. 253–254, 304–306.